No. 882,411. PATENTED MAR. 17, 1908.
F. NESTOR.
COOKING VESSEL.
APPLICATION FILED MAY 29, 1907.

WITNESSES
E. G. Bromley

INVENTOR
French Nestor
BY
ATTORNEYS

UNITED STATES PATENT OFFICE.

FRENCH NESTOR, OF ELKINS, WEST VIRGINIA.

COOKING VESSEL.

No. 882,411.　　　　Specification of Letters Patent.　　Patented March 17, 1908.

Application filed May 29, 1907. Serial No. 376,228.

*To all whom it may concern:*

Be it known that I, FRENCH NESTOR, a citizen of the United States, and a resident of Elkins, in the county of Randolph and State of West Virginia, have invented a new and Improved Cooking Vessel, of which the following is a full, clear, and exact description.

This invention has reference to improvements in cooking vessels, such, for example, as pots, kettles, etc., the object of which primarily is to prevent the vessel from boiling dry, at least within a reasonable time. This I accomplish by providing in connection with the vessel, a tank superposed thereon with automatic means, preferably float-controlled, for admitting the liquid from the tank to the vessel when the level of the liquid in the latter sinks below a predetermined point, whereby a certain height of liquid in the pot is maintained.

Reference is to be had to the accompanying drawings forming a part of this specification, in which similar characters of reference indicate corresponding parts in all the figures.

Figure 1:
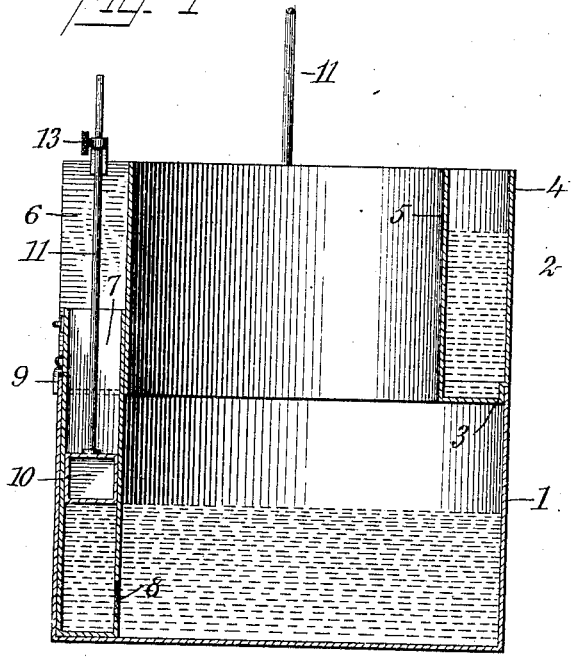
Figure 3:
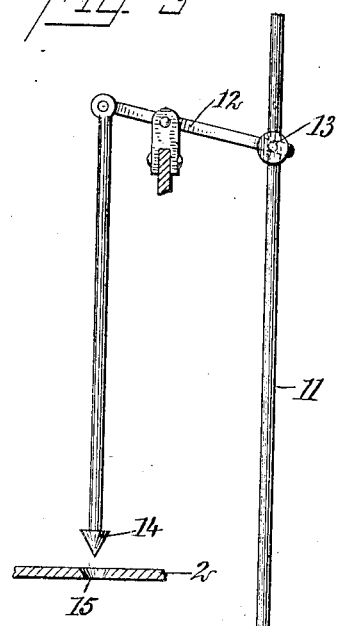
Figure 2:
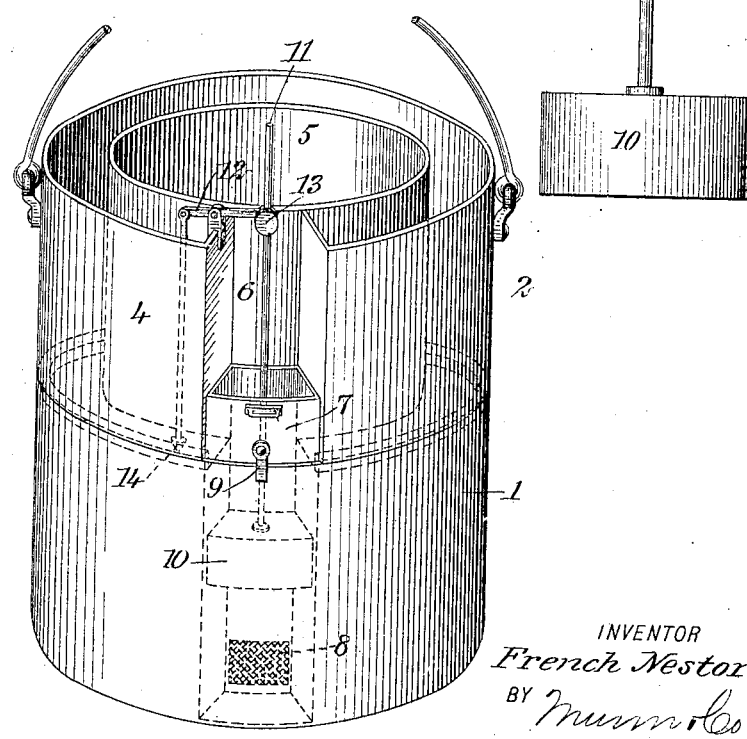

Figure 1 is a central, vertical section through the preferred embodiment of my invention; Fig. 2 is a perspective view of the same, looking in a direction at right angles to Fig. 1, and Fig. 3 is a view of the means, partly in section, for automatically controlling the level of the liquid in the pot.

The invention comprises a cooking vessel 1, that shown being in the nature of a cylindrical pot and a tank 2 seated thereon, which is slightly reduced in diameter at its lower end, as indicated at 3, to exactly fit within the pot and provide a shoulder for engaging its upper edge. The tank 2, as best shown in Fig. 1, is made up of an outer cylinder 4 and an inner concentric cylinder 5 open throughout its length, said cylinders providing an annular space which is provided with a bottom and is adapted to receive and hold the liquid which is to be automatically fed to the pot. A longitudinal slot 6 is formed in one side of the tank, by radially turning the cylinder 2 inwardly at opposite sides, and joining the same to the cylinder 5, said slot being adapted to slidably receive a well 7, which conforms thereto, and is provided with a strainer 8 located near its bottom and adapted to form communication between the well and the pot when the well is held to the bottom of the pot, as illustrated in Figs. 1 and 2. When the well is thus disposed, it is held against displacement not only by the side walls of the slot 6 but also by a clip 9 which passes over the top of, and engages with, the side of the pot.

Within the well 7 loosely fits a hollow float 10, having a tubular standard or stem 11 rigidly secured and projecting from its upper face and acting to admit and discharge air therefrom when the float contracts and expands. The standard is of sufficient length to project to the top of the tank when the float sinks to near the bottom of the well, whereby it may have adjustably secured thereto at any elevation of the float, a lever 12, the latter being pivotally supported from one of the side-walls of the slot 6 and provided with an eye slidable on the standard 11 and carrying a set-screw 13 for securing it to the standard at any required point. On loosening the set-screw 13 the eye will slip from the standard in removing the tank, leaving the float in the well. The opposite end of the lever 12 overhangs the tank and pivotally supports the stem of a depending valve 14 which is adapted to be normally seated over an opening 15 formed in the bottom of the tank.

In the operation of the vessel, as the water boils out or otherwise sinks in the pot 1, the float 10 drops and withdraws the valve 14 from its seat until the level of the water within the pot has been again established, when the valve is automatically closed, thus operating to keep a certain level of liquid at all times within the pot. This level may be regulated by adjusting the connection between the lever 12 and the standard 11, whereby any predetermined height of liquid in the pot may be maintained. Should the pot contain any solid substance, the same will be prevented from passing within the float well and interfering with the free movement of the float therein, by the strainer 8.

The invention as shown and described, although being my preferred form of construction, may obviously be materially modified within the scope of the invention, as defined in the annexed claims.

Having thus described my invention I claim as new and desire to secure by Letters Patent:

1. In combination with a cooking vessel, a tank composed of two cylinders forming an annular space therebetween adapted to contain a liquid, and float-controlled means arranged at the outside of the tank for automatically feeding said liquid from said annular space to said vessel when the level of the liquid in the vessel sinks below a predetermined point.

2. In combination with a cooking vessel, a tank adapted to contain a liquid, float actuated means for automatically feeding said liquid from said tank to said vessel when the level of the liquid in the vessel sinks below a predetermined point, and means for vertically adjusting the float to regulate the height of the liquid maintained in the vessel.

3. In combination with an open cooking vessel, a tank superposed thereon and substantially unobstructing the opening in the vessel, whereby the vapor may escape therefrom when the tank is filled, a float-well adapted to be passed within the vessel and communicating therewith, a valve-controlling communication between the tank and vessel, and a float within said well for operating said valve.

4. In combination with a cooking vessel, a tank seated thereon composed of two cylinders concentrically arranged, providing an annular space therebetween, adapted to contain a liquid, a longitudinal slot formed in said tank, a float well within the slot adapted to project into the vessel, a valve for controlling the passage of the liquid from the tank to the vessel, and a float for operating said valve.

5. In combination with a cooking vessel, a tank seated thereon composed of two cylinders concentrically arranged, providing an annular space therebetween, adapted to contain a liquid, a longitudinal slot formed in said tank, a float well within the slot adapted to project into the vessel, a float within the well having a standard fixed thereto, a lever pivotally supported from the tank adapted to be adjustably fixed to said standard, and a valve pivotally suspended from said lever for controlling the passage of the liquid from the tank to the vessel.

6. In combination with a cooking vessel adapted to have heat applied thereto, a tank seated on said vessel composed of an inner and outer hollow body forming a space therebetween, adapted to contain a liquid, and means unobstructing the opening in the inner hollow body for automatically feeding said liquid from the tank to the vessel when the liquid in the latter boils away to leave the level thereof below a predetermined point.

In testimony whereof I have signed my name to this specification in the presence of two subscribing witnesses.

FRENCH NESTOR.

Witnesses:
HOWARD SUTHERLAND,
T. W. STALNAKER.